United States Patent [19]

Watanabe et al.

[11] Patent Number: 5,190,700
[45] Date of Patent: Mar. 2, 1993

[54] FLAME RETARDANT FOR HALOGEN-CONTAINING VINYL RESINS

[75] Inventors: Deitaro Suzuki, Funabashi; Kouji Shishido, Toyama; Masayuki Teranishi, Kasukabe; Masuo Shindo, Ichihara, all of Japan

[73] Assignee: Nissan Chemical Industries, Ltd., Tokyo, Japan

[21] Appl. No.: 574,606

[22] Filed: Aug. 29, 1990

Related U.S. Application Data

[63] Continuation-in-part of Ser. No. 311,524, Feb. 16, 1989, abandoned.

[30] Foreign Application Priority Data

Feb. 25, 1988 [JP] Japan .................................. 63-42640

[51] Int. Cl.$^5$ .................................................. C09K 21/02
[52] U.S. Cl. ....................................... 252/609; 252/602
[58] Field of Search ................................................ 252/609

[56] References Cited

U.S. PATENT DOCUMENTS

| Re. 31,214 | 4/1983 | Petrow et al. | 252/609 |
|---|---|---|---|
| 3,080,406 | 3/1963 | Marks et al. | 252/609 |
| 3,676,477 | 7/1972 | Chay et al. | 252/609 |
| 3,873,451 | 3/1975 | Cumbo et al. | 252/609 |
| 4,010,104 | 3/1977 | Radlmann et al. | 252/609 |
| 4,018,809 | 4/1977 | Radlmann et al. | 252/609 |
| 4,110,247 | 8/1978 | Gower, II et al. | 423/627 |
| 4,396,730 | 8/1983 | Imanashi | 252/609 |
| 4,589,997 | 5/1986 | Watanabe et al. | 252/609 |
| 4,608,198 | 8/1986 | Watanabe et al. | 252/609 |
| 4,741,865 | 5/1988 | Kintz et al. | 252/609 |

FOREIGN PATENT DOCUMENTS

| 45-14358 | 5/1970 | Japan . |
|---|---|---|
| 46-7170 | 2/1971 | Japan . |
| 60-203657 | 10/1985 | Japan . |
| 61-227918 | 10/1986 | Japan . |
| 63-277259 | 11/1988 | Japan . |

OTHER PUBLICATIONS

Garcia, "Transparent Antimony Based Flame Retardants For Vinyl Coated Fabrics", Journal of Coated Fabric, vol. II, pp. 137–142 (1982).

Primary Examiner—Richard D. Lovering
Assistant Examiner—Joseph D. Anthony
Attorney, Agent, or Firm—Frishauf, Holtz, Goodman & Woodward

[57] ABSTRACT

The present invention provides a power flame retardant for a halogen-containing vinyl resin, which comprises the following Components A, B and C. (A) 5 to 30 parts by weight of at least one of alkali metal compound of lithium, sodium and potassium calculated as the formula $M_2O$ where M is an alkali metal; (B) 0.2 to 10 parts by weight of a perchloric acid radical in the form of the acid or a salt or amine thereof, calculated as perchloric acid radical; and (C) 1 to 50 parts by weight of a hydrophobic dispersing agent having a boiling point or a decomposition temperature of 200° C. or higher. All the parts by weight are based on 100 parts by weight of antimony pentoxide ($Sb_2O_5$). The flame retardant of the present invention does not impair transparency of the halogen-containing vinyl resin, and also does not worsen various physical properties such as thermal stability and weathering resistance. The invention also provides (1) flame retardant halogen containing resins and (2) a process for preparing the powdered flame retardant.

31 Claims, No Drawings

FLAME RETARDANT FOR HALOGEN-CONTAINING VINYL RESINS

CROSS REFERENCE TO RELATED APPLICATION

This application is a continuation-in-part application of application Ser. No. 07/311,524, filed Feb. 16, 1989, now abandoned.

BACKGROUND OF THE INVENTION

1. Field of the Invention

This invention relates to a flame retardant for halogen-containing vinyl resins in which antimony pentoxide is contained as a main component, more specifically to a fame retardant for halogen-containing vinyl resins in which antimony pentoxide ($Sb_2O_5$) is contained as a main component and which does not impair the transparency of the thermal stability of vinyl chloride resins.

2. Background Information

The halogen-containing vinyl resin itself has excellent fame retardancy, but a so-called flexible vinyl chloride resin plasticized with a plasticizer such as dioctyl phthalate and a halogen-containing vinyl resin blended with a combustible resin arc easily burnt. With regard to flexible vinyl chloride products such as leathers, hood cloths, wire-covering materials, films and sheets which are widely utilized as interior materials for automobiles, electrical and electronic parts, and architectural materials, or rigid vinyl chloride products blended with a reinforcing material against shock, it is especially essential to provide flame resistance.

In order to provide these resins with the flame resistance, a variety of flame retardants have been used. Examples of the flame retardants which are used include inorganic materials such as antimony trioxide ($Sb_2O_3$), sodium antimonate, aluminum hydroxide, zirconium oxide, zinc borate and borax as well as organic materials such as tricresyl phosphate, trichloroethyl phosphate and chlorinated paraffins. Further, organic flame retardants containing bromine are also employed in rare cases. These flame retardants mentioned above have some advantages and disadvantages from the viewpoints of flame-resisting effect, transparency, thermal stability, weather resistance, cold resistance, bleed/bloom resistance and the like.

Antimony trioxide displays an extremely great opacifying effect, since it generally has a particle diameter of 0.5 to 10 μm or so, a large refractive index and a small light transmittance. Therefore, the transparency which is the greatest feature of the halogen-containing vinyl resin will be completely lost, if the above-mentioned antimony trioxide is mixed with the resin. Further, when a pigment is added to the vinyl resin containing the antimony trioxide with the intention of coloring, a great deal of the pigment is required because of this opacifying effect, and kinds of obtainable colors are disadvantageously limited. In order to overcome these drawbacks, it has been suggested to excessively lessen the particle diameter of the antimony trioxide (Japanese Patent Publication No. 7170/-1971) and to conversely increase the particle diameter by single crystallization. Both of them contemplate improving the light transmittance. In the case of the former, the transparency can remarkably be enhanced, but if the pigment is added, the opacifying function will be heightened, the thermal stability also will become poor, and the manufacturing cost will rise. In the case of the latter sufficient transparency cannot be obtained. Inorganic materials such as aluminum hydroxide, zirconium oxide, zinc borate and borax are poorer in the flame-resisting effect than antimony trioxide, and have the behavior of losing the transparency of the resin like the antimony trioxide. A phosphorous plasticizer such as tricresyl phosphate and a chlorinated paraffin which have no behavior of losing the transparency but which have a plasticizing action are poorer in the flame-resisting effect than the antimony trioxide, therefore they must be added in greater amounts. As a result, bleeding will tend to occur and the cold resistance will deteriorate.

Antimony pentoxide is a flame retardant which is applicable to the halogen-containing vinyl resin which does not cause transparency of the resin to be lost (Journal Coated Fabric, Vol. 11, 1982, p. 137). This flame retardant is antimony pentoxide tetrahydrate which is prepared by bringing an antimony pentoxide sol (its particle diameter ranges from $20 \times 10^{-3}$ to $100 \times 10^{-3}$ μm) into a powdery form with the aid of spray drying or the like. As for this antimony pentoxide tetrahydrate, the refractive index is small and primary particles are extremely fine. Therefore, the antimony pentoxide tetrahydrate has a great light transmittance, which fact indicates that the transparency of the resin is very good. This antimony pentoxide, however, has the drawback of worsening the thermal stability of the resin.

For the purpose of eliminating this drawback, it has been suggested to make use of a Ba-Cd-Zn stabilizer or a tin mercaptide stabilizer. However, these stabilizers cannot be practically used, because of the formation of harmful cadmium and the bleed/bloom in the case of the Ba-Cd-Zn stabilizer, and because of a bad weather resistance in the case of the tin mercaptide stabilizer.

The present inventors have considered that the above problems would be caused because the antimony pentoxide which is obtained by subjecting antimony pentoxide sol to spray drying has strong cation exchangeability and it attracts the metal which is to be used as a stabilizer for the halogen-containing vinyl resin to the antimony pentoxide particles so that thermal stability of the halogen-containing vinyl resin becomes bad and practical application becomes impossible. Thus, the present inventors have proposed an antimony pentoxide type flame retardant which can overcome the above problems in Japanese Provisional Patent Publication No. 58453/1985 (which corresponds to U.S. Pat. No. 4,608,198).

That is, the above problems, particularly thermal stability can be greatly improved by antimony pentoxide containing an alkali metal, an alkaline earth metal and/or zinc, lead, and further an organic acid, a phosphoric acid and/or alkali phosphate.

However, in the improved antimony pentoxide type flame retardant, if an added amount is increased to improve flame retardancy, it can be clarified that it has a tendency that transparency, thermal stability and weather resistance are lowered.

The use of perchlorate to improve the thermal stability of a vinyl chloride resin has been known in the art as described in Japanese Provisional Patent Publication No. 203657/1985 (*Chemical Abstracts*, Vol. 104 169513w).

Japanese Patent Application No. 110307/1987, filed May 6, 1987, published on November 15, 1988 as Unexamined Publication No. 277259/1988 concerns a flame retardant comprising antimony pentoxide, an alkyl metal compound, at least one compound of an alkaline earth metal, zinc or lead, perchloric acid and optionally organic acid and phosphoric acid.

In recent years, accompanying diversification of demand for the halogen-containing vinyl resin, a demand for the flame retardant halogen-containing vinyl resin having excellent transparency and coloration has increased more and more.

The present inventors have conducted intensive studies to resound to such a demand and to provide an antimony pentoxide type flame retardant which is more excellent in transparency and which does not lower various properties such as thermal stability and weather resistance.

Since the surface of antimony pentoxide colloid is acidic, it has a property to strongly bound with an organic base such as an amine, etc., so that by combining a hydrophobic amine, the antimony pentoxide colloid becomes hydrophobic. This hydrophobic antimony pentoxide colloid is dispersed in a plasticizer such as dioctyl phthalate (DOP) extremely well. Accordingly, the present inventors have considered that a flame retardant obtained by preventing the ion exchangeability of the antimony pentoxide and making the antimony pentoxide colloid a hydrophobic colloid which can be dispersed in the halogen-containing vinyl resin in the form of an extremely uniform colloid, whereby the halogon-containing vinyl resin can be made highly transparent to accomplish the present invention.

SUMMARY OF THE INVENTION

That is, the present inventors have found that a powder obtained by adding a hydroxide of an alkali metal and a perchloric acid compound to the antimony pentoxide colloid, then adding a hydrophobic amine to the resultant mixture to obtain a slurry in which colloid particles of the antimony pentoxide are made hydrophobic and drying said slurry, when used as the flame retardant for a halogen containing resin, can give remarkably excellent transparency, and can improve surprisingly thermal stability, thermal aging characteristic, initial coloration and weather resistance.

The present invention relates to a flame retardant for a powder halogen-containing vinyl resin which comprises, (A) 5 to 30 parts by weight of at least one alkali metal compound of lithium, sodium and potassium calculated as the formula $M_2O$ where M is said alkali metal; (B) 0.2 to 10 parts by weight of a perchloric acid radical in the form of the acid or a salt or amine thereof, calculated as perchloric acid radical ($ClO_4$); and (C) 1 to 50 parts by weight of a hydrophobic dispersing agent having a boiling point or a decomposition temperature of 200° C. or higher, based on 100 parts by weight of antimony pentoxide ($Sb_2O_5$).

DESCRIPTION OF THE PREFERRED EMBODIMENTS

The antimony pentoxide sol to be used in the present invention is an antimony pentoxide sol with primary particle sizes of 5 to $100 \times 10^{-3}$ μm which is prepared by the method of reacting antimony trioxide with potassium hydroxide to obtain potassium antimonate and then deionizing it (Japanese Patent publication No. 11848/1982 which corresponds to U.S. Pat. No. RE 031,214), the method of deionizing alkali antimonate with an ion exchange resin (U.S. Pat. No. 4,110,247), the method of reacting an alkali antimonate with an inorganic acid and then peptizing the reaction product (Japanese Provisional Patent Publication No. 41536/1985 which corresponds to U.S. Pat. No. 4,589,997, and Japanese Provisional Patent Publication No. 227918/-1986), etc. The antimony pentoxide sol prepared by these methods can be expressed as $Sb_2O_5(Na_2O)_x \cdot nH_2O$, and generally x is 0 to 0.4 and n is 2 to 4.

As the alkali metal compound which is the component (A) of the flame retardant of the present invention, hydroxides or salts of at least one alkali metal selected from lithium, sodium and potassium may be included. However, when chloride salts are used, anions such as chloride ions must be removed by washing, etc. and therefore hydroxides or carbonates of alkali metals are preferred. Particularly, sodium hydroxide and sodium carbonate are preferred.

The amount of the above alkali metal compound added may be preferably 0.6 to 1.2 in terms of $M_2O/Sb_2O_5$ molar ratio, 5 to 30 parts by weight as $M_2O$ (M=Li, Na or K) based on 100 parts by weight of antimony pentoxide ($Sb_2O_5$). With an amount less than 5 parts by weight, cation exchange capacity cannot be sufficiently blocked and would provide an inferior flame retardant agent. On the other hand, although the effect can be obtained with an amount exceeding 30 parts by weight, the alkali will remain if the amount exceeds that amount, whereby the composition becomes strongly alkaline and can be handled with difficulty.

Also, a part of the alkali metal compound can be changed to a soluble hydroxide of an alkaline earth metal (Mg, Ca, Sr and Ba) and zinc, lead or a salt of zinc or lead. For example, basic zinc carbonate, zinc benzoate or the like can be used. Even if an alkali metal may be added to an antimony pentoxide sol at a $M_2O/Sb_2O_5$ molar ratio of 0.8 or more, the structure of the antimony pentoxide is retained without formation of antimonate salt.

When the perchlorate of an alkali salt is used, an alkali portion thereof functions a Component (A).

An object of adding the perchloric acid compound to the flame retardant of the present invention is to avoid a deterioration of the thermal stability and thermal aging property of a halogen-containing vinyl resin when applying the flame retardant of the present invention to the resin.

As the perchloric acid compound which is the component (B) of the flame retardant of the present invention, any compound may be available, but it should preferably be added in the form of an aqueous solution. For example, there may be included perchloric acid, sodium perchlorate, potassium perchlorate, amine perchlorate, ammonium perchlorate, magnesium perchlorate, lithium perchlorate, barium perchlorate, strontium perchlorate, lead perchlorate, cesium perchlorate and rubidium perchlorate.

The perchlorate amine may include perchlorates obtained from amines of at least one selected from among aliphatic amines, aromatic amines, aralkylamines, alkanolamines having a boiling point or a decomposition temperature of 200° C. or higher and amine type surfactants with average added moles of ethylene oxide of 1 to 20. As the above aliphatic amines, aliphatic amines having 9 or more carbon atoms such as dodecylamine, tetradecylamine, octadecylamine and the like may be included. As the aromatic amine, diphenylamine, naphthylamine and the like may be included. As the aralkylamine, dibenzylamine, tribenzylamine, phenylethylamine and the like may be included. As the alkanolamine, triethanolamine, diethanolamine and the like may be included. Further, as the amine type surfactant with average added moles of ethylene oxide of 1 to 20, alkylamine ethylene oxide derivatives with added moles of ethylene oxide of 1 to 20 may be included. For example, alkylamine ethylene oxide derivatives with added moles of ethylene oxide of 1 to 20 such as oxyethylene dodecylamine, polyoxyethylene dodecylamine, polyoxyethylene octadecylamine, polyoxyethylene tallow alkylamine, polyoxyethylene tallow alkylpropylenediamine or the like.

The amount of the above perchloric acid compound added may be 0.2 to 10 parts by weight as perchloric acid radical ($ClO_4$) based on 100 parts by weight of antimony pentoxide ($Sb_2O_5$), particularly preferably 2 to 8 parts by weight. With an amount less than 0.2 part by weight, thermal stability and thermal aging characteristics of the halogen-containing vinyl resin cannot be sufficiently improved. On the other hand, addition in an amount over 10 parts by weight may be possible, but it is economically meaningless because further improvement of thermal stability, thermal aging characteristic, etc. cannot be achieved by addition in such amount or more.

An antimony pentoxide sol is used as a starting material in the present invention. The usual antimony pentoxide sol is an aqueous sol, and colloids of antimony pentoxide are dispersed in water. The antimony pentoxide colloids in this state are not hydrophobic, but instead are hydrophilic. The hydrophobic dispersing agent is used to improve the dispersibility of the antimony pentoxide colloids in the flame retardant which is admixed in the vinyl resin by imparting hydrophobic character to said colloids.

Since the surface of an antimony pentoxide colloid is acidic, it strongly binds to a hydrophobic amine, which is one of the hydrophobic dispersants for use in the present invention. As a result, the antimony pentoxide colloids become hydrophobic so that they agglomerate and precipitate in a slurry state. When the slurry is dried and powdered, and then mixed with dioctylphthalate, which is a plasticizer for vinyl chloride, it is dispersed therein extremely well, whereby the antimony pentoxide colloids are subsequently well dispersed in the resin. When the dispersibility is improved, there is an effect of not impairing the transparency of the resin.

Accordingly, an object of adding the hydrophobic dispersing agent to the flame retardant of the present invention is to improve dispersibility of the flame retardant to the halogen-containing vinyl resin and to maintain transparency of said resin when applying it to said resin.

As the hydrophobic dispersing agent having a boiling point or a decomposition temperature of 200° C. or higher which is the component (C) of the flame retardant of the present invention, there may be preferably included hydrophobic amine compounds, higher fatty acids having 12 or more of carbon atoms, and their esters, ethers or amides, and phosphates of ether type nonionic surfactants, etc. Particularly, addition of the hydrophobic amine compound causes improvement in dispersibility of the flame retardant to the halogen-containing vinyl resin and has a tendency of improving the transparency of the composition.

Thus, as the hydrophobic dispersing agent, it is preferably to use a hydrophobic amine alone or a combination of the hydrophobic amine and another dispersing agent. However, only a hydrophobic dispersing agent other than the above hydrophobic amine may be acceptable.

As the hydrophobic amine compound, there may be included at least one compound selected from among aliphatic amines, aromatic amines, aralkyl amines having a boiling point or decomposition temperature of 200° C. or higher or amine type surfactants with average added moles of ethylene oxide of 1 to 5 similarly as the amines of the perchlorate amines as previously described. Among them, amine type surfactants with average added moles of ethylene oxide of 1 to 5 are preferred. Examples of aliphatic amines, aromatic amines or aralkyl amines having a boiling point or decomposition temperature of 200° C. or higher may include aliphatic amines having 9 or more carbon atoms such as dodecylamine, tetradecylamine, octadecylamine and the like; aromatic amines such as diphenylamine, naphthylamine and the like; aralkyl amines such as dibenzylamine, tribenzylamine, phenylethylamine and the like.

As the amine type surfactant with average added moles of ethylene oxide of 1 to 5, there may be included alkylamine ethylene oxide derivatives with added moles of ethylene oxide such as polyoxyethylene dodecylamine, polyoxyethylene octadecylamine, polyoxyethylene tallow alkylamine, polyoxyethylene tallow alkylpropylenediamine and the like.

Among these hydrophobic amine compounds, preferred is the amine type surfactant with average added moles of ethylene oxide of 1 to 5.

If the added moles of ethylene oxide exceed 6, the hydrophobicity of the polyoxyethylene alkylamine becomes smaller, whereby the dispersibility of the flame retardant into the halogen-containing resin will be undesirably worsened.

When the hydrophobic dispersing agent as mentioned above is the perchlorate of a hydrophobic amine salt which is one of said hydrophobic dispersing agents, said salt is adhered on the surface of an antimony pentoxide colloid and an amine portion thereof functions as Component (C) and a perchlorate portion functions as Component (B) (see Examples 8 to 13 herein).

As the hydrophobic dispersing agent of the higher fatty acid having 12 or more of carbon atoms, and their esters, ethers or amides, there may be included sorbitan fatty acid esters such as sorbitan stearate, sorbitan palmitate, sorbitan laurate, sorbitan oleate, sorbitan tristearate, sorbitan behenate, sorbitan sesquioleate, sorbitan trioleate, etc.; glycerin aliphatic acid esters such as glycerin oleate, glycerin stearate, glycerin laurate, etc.; ethylene bisamide of the higher fatty acids; monoamides of the higher fatty acids, etc.

As the phosphates of the ether type nonionic surfactants, there may be included polyoxyethylene adducts of mono- or dialkyl phosphates, mono- or diaryl phosphates, or mono- or dialkylaryl phosphates (for example, trade name of "GAFAC" produced by Toho Kagaku Co.).

Further, in addition to the above hydrophobic dispersing agents, there may be used a lubricating agent such as a natural wax, a synthetic wax, a paraffin wax having a high melting point; and further used a hydrophobic dispersing agents such as a liquid state epoxidized soybean oil, a silicone oil, dioctylphthalate, etc.; and a plasticizer such as phosphoric type plasticizer. However, if an added amound thereof becomes greater, it is not preferred since the resulting powder does not dry.

The amount of the hydrophobic dispersing agent added in the present invention depends on the primary particle size of the antimony pentoide colloid of the antimony pentoxide sol employed, and the amount of the agent required for hydrophobic modification becomes greater as the particle size is maller. It is also different depending on the molecular weight of the agent employed, but may be preferably 1 to 50 parts by weight, particularly 4 to 35 parts by weight, based on 100 parts by weight of antimony pentoxide oxide ($Sb_2O_5$). If the amount exceeds 50 parts by weight, there is no more improvement effect of dispersibility, i.e., it becomes economically meaningless. In the case that only the hydrophobic amine is used, if it exceeds 50 parts by weight, a drawback may emerge that due to the presence of excessive amine, it may be attached in greater amount onto rolls during kneading into a halogen-containing vinyl resin or that the physical properties such as weathering resistance, etc. of the halogen-containing vinyl resin obtained may be worsened. On the other hand, with an amount of less than 1 part by weight, dispersibility into a halogen-containing vinyl resin becomes poor, whereby good transparency cannot be obtained.

In the present invention, the order of adding the hydrophobic dispersing agent, the alkali metal compound and the perchloric acid compound is not particularly limited. They may be added at the same time. If the perchloric acid compound is added before addition of the hydrophobic dispersing agent and the alkali metal compound, the perchloric acid cations are incorporated in the antimony pentoxide colloid particles, which exhibit strong acidity. Therefore, it should preferably be added after addition of the alkali metal compound.

In the present invention, addition of the hydrophobic dispersing agent, the alkali metal compound and the perchlorate compound as described above into the antimony pentoxide sol and stirring can be practiced at room temperature to 100° C.

Addition of the hydrophobic dispersing agent other than the hydrophobic amine may preferably be carried out at 50 to 100° C. When mixing these dispersing agents, in order to mix them uniformly, if desired, it is preferred that a hydrophilic organic solvent including lower alcohols such as methanol, ethanol, isopropanol, n-propanol, etc., or methyl cellosolve, etc. is added thereto.

The product obtained by adding the alkali metal compound, the perchloric acid compound and the hydrophobic dispersing agent, etc. to the antimony pentoxide sol as described above is formed in a slurry. In said slurry, antimony pentoxide forms a hydrophobic agglomerate, and water layer becomes separated when the slurry is left to stand. By separating and drying the solid obtained from the slurry, the powdery flame retardant of the present invention is obtained. As the drying method, those conventionally practiced can be applied.

More specifically, said slurry may be dried as such by a spray dryer, a drum dryer, a freeze dryer, etc. to form powder. The drying temperature in this case is not particularly limited, but it may be such that free water can be removed within the range wherein the product temperature docs not exceed around 200° C. at the maximum. As another method, said slurry may be filtered through a filter press, a centrifugal filter, aspiration filter, etc., and the wet cake may be dried by a hot air dryer, a vacuum dryer, etc. After such drying, the dried product may be crushed into powder, if desired.

Also, the powder obtained by spray dryer, etc. may be crushed into more fine powder, if desired.

The flame retardant of the present invention thus obtained has particle sizes ranging from 0.2 to 40 μm. Since the flame retardant of the present invention can be very readily crushed, it has the specific feature of being readily crushed even when mixed with a halogen containing resin by means of a ribbon mixer, Henschel mixer, etc. Besides, since it also exhibits good dispersibility into a plasticizer during hot roll kneading, the desired transparency, flame retardancy, etc. can be also obtained even when powder with sizes over 40 μm may be employed.

The thus obtained flame retardant of this invention is blended with a halogen-containing vinyl resin, a plasticizer such as dioctyl phthalate (DOP), a Ba-Zn series stabilizer or the like and an additive such as an epoxidized soybean oil in a known procedure. For example, a halogen-containing vinyl resin, a powdery stabilizer and a flame retardant are mixed; a liquid stabilizer and DOP in which an epoxidized soybean oil has already been dissolved are added thereto while stirring is carried out by a Henschel mixer; and the mixing is continued till a temperature of 105° to 115° C. is reached. In this case, an amount of the flame retardant is within the range of 0.5 to 20 parts by weight relative to 100 parts by weight of the halogen-containing vinyl resin.

The powdery flame retardant of the present invention containing an amine as the hydrophobic dispersing agent also has the property of becoming an organosol through peptization when it is added into a hydrophobic organic solvent. Since the powdery flame retardant of the present invention can be added into a phthalic acid diester, etc. which is used as the plasticizer of a halogen containing vinyl resin to be dispersed as a sol, a plasticizer in which the flame retardant of the present invention is incorporated also may be used in the sol state.

In the present invention, the halogen-containing vinyl resins mean a vinyl chloride resin and its copolymers. The copolymers of the vinyl chloride resin include the copolymers with ethylene, propylene, vinylidene chloride, vinyl acetate, vinyl alcohol, acrylic ester, methacrylic ester, styrene, acrylonitrile and the like. Further, the aforesaid copolymers include the graft copolymers with polystyrene-vinyl acetate, polyester, polyurethane and polystyrene. In the present invention, the copolymers can be defined as polymers including two or more monomers.

The flame retardant of the present invention was mixed with a halogen containing vinyl resin, a plasticizer and a Ba-Zn stabilizer by a Henschel mixer, and then a masticated sheet with a thickness of 0.7 to 0.8 mm was prepared on two rolls of 170° C., and further the thermal stability of the sheet was tested by the gear oven method.

As the result, the flame retardant was surprisingly found to show no abnormality in spite of a large amount of a hydrophobic dispersing agent such as a hydrophobic amine added, and also the sheet obtained had a vary excellent thermal stability.

Further, the transparency of the sheet obtained by pressing of the above kneaded sheet was remarkably good and transparency was almost equal to that when no flame retardant is added at lower levels of the flame retardant. While the transparency in the case of the flame retardant disclosed in Japanese Provisional patent publication No. 58453/1986 already proposed by the present inventors (the evaluation method is the same as that described below) was 33 to 48% as described in Examples in the same published specification, the transparency is enhanced to about 2-fold as 62 to 87% as described in Examples in the case of the flame retardant of the present invention.

The flame retardant of the present invention also exhibited very good results in the thermal aging test, the initial coloration characteristic and the weathering resistance test as shown in the evaluation tests in the following Examples.

Thus, the flame retardant of the present invention does not impair transparency of the halogen containing vinyl resin, and also has the effect of not worsening thermal stability, thermal aging characteristic, initial coloration characteristic and weathering resistance.

EXAMPLES

The present invention is described in more detail by referring to Examples and Comparative examples, by which the present invention is not limited at all. The flame retardants obtained in Examples and Comparative examples were formulated as shown in Table 1, and evaluated according to the evaluation methods as described below. The results are shown in Table 3.

The "%" of the composition in Examples and Comparative examples is shown by "% by weight". First, the evaluation methods of the flame retardant are to be described.

Method for evaluation of flame retardant

Thermal stability (blackening time): The test strip was prepared by mixing the components according to the recipe A shown in Table 1, kneading the mixture by two rolls at 170° C. for 3 minutes to form a sheet with a thickness of 0.7 to 0.8 mm, and the time before reaching blackening at an oven temperature of 185° C. was measured.

Initial coloring characteristic (YI value): The test strip was prepared by mixing the components according to the recipe A shown in Table 1, kneading the mixture by two roll at 165° C. for 3 minutes, and then pressing the kneaded product at 180° C. into a press sheet with a thickness of 1 mm. The color difference of the press sheet with reflected light was measured, and the coloration characteristic was shown by YI value (yellow value).

Transparency: The test strip was prepared by forming a press sheet with a thickness of 1 mm according to the formulation recipe B in Table 1 by the same method as in the above test, and transmittance (L value) of the light transmitting through the press sheet was measured.

Bleeding characteristic: The test strip was prepared by forming a press sheet with a thickness of 1 mm according to the same method as in testing the initial coloration characteristic, and whether liquid is bleeded out on the sheet surface or not when the press sheet was left to stand in an atmosphere of 80° C. and a humidity of 99% for 7 days was observed with eyes was measured.

Standards for judgement:
○: no bleeding, △: slight bleeding present, X: bleeding present.

Thermal aging characteristic: The test strip was prepared by forming a press sheet of 0.5 mm according to the formulation recipe C shown in Table 1 by the same method as in the initial coloration characteristic test, and the residual tensile elongation was determined after suspending the test in an oven of 120° C. for 400 hours.

Weathering resistance: The test strip was prepared by forming a film of 0.2 mm according to the recipe C shown in Table 1 by the same method as in the thermal stability test, and the residual tensile elongation after irradiation with QUV for 250 hours was determined.

QUV: DPWL-5R Model (Produced by Suga Shikenki K. K.)
Irradiation luminance: 3.5 mW/cm$^2$
Black panel temperature: 60° C.
Temperature when wet: 50° C.

Flame retardancy: The test strip was prepared by forming a press sheet of 0.45 mm according to the recipe B shown in Table 1 by the saame method as in the initial coloration characteristic test, and the horizontal combustion speed was measured according to the MVSS-302 method.

Oxygen index: The test strip was prepared by forming press sheet of 3.2 mm according to the recipe D shown in Table 1 by the same method as in the initial coloration characteristic test, and the measurement was conducted according to JIS K 7201.

TABLE 1

| Formulation | A | B | C | D |
|---|---|---|---|---|
| PVC (Note 1) | 100 | 100 | 100 | 100 |
| Plasticizer (Note 2) | 60 | 60 | 60 | 50 |
| Stabilizer | | | | |
| Liquid Ba—Zn Ac-190 (Note 3) | 1.2 | — | 1.2 | 1.2 |
| Liquid Ba—Zn AP-550 (Note 4) | 0.4 | — | 0.4 | 0.4 |
| Liquid Ba—Zn LTL-257K (Note 5) | — | 1.5 | — | — |
| Liquid Ba—Zn BP-58AW (Note 6) | — | 1.0 | — | — |
| Epoxidized soybean oil O-130P (Note 7) | 1.0 | 1.0 | 1.0 | 1.0 |
| Flame retardant | 7.0 | 3.0 | 7.0 | 5.0 |

(Note 1): Polymerization degree 1000
(Note 2): dioctyl phthalate except for the recipe C, and phthalic acid ester of alcohols with 9 to 11 carbon atoms (product name: DL-911P (trade name), produced by Shinnippon Rika Co.) for the recipe C.
(Note 3), (Note 4) and (Note 7): Trade names all produced by Adeka-Agurs Co.
(Note 5) and (Note 6): Trade names both produced by Nissan Ferro Organic Chemistry Co.

EXAMPLE 1

To 977 g of an antimony pentoxide sol (Sb$_2$O$_5$ 13.1%, Na$_2$O 0.98%, Na$_2$O/Sb$_2$O$_5$ molar ratio: 0.39, viscosity: 4.5 c.p. and pH: 1.90) with particle sizes of 20 to 40×10$^{-3}$ μm as observed by electron microscope obtained according to the method as described in Japanese Provisional Patent Publication No. 227918/1986 was added 8.6 g of 90% sodium hydroxide, and the mixture was stirred at 85° C. for one hour. After cooled to room temperature, 27.6 g of an aqueous 20% NaClO$_4$ was added. The mixture was stirred for 30 minutes, and further 16.7 g of a polyoxyethylene dodecylamine with added moles of ethylene oxide of 2 (trade name: Naimine L-202, produced by Nippon Oil & Fats Co., Ltd.) was added, followed by stirring of the mixture for 35 minutes. In the resultant slurry, antimony pentoxide was found to form a hydrophobic agglomerate, and slurry was separated into aqueous layer and antimony pentoxide containing layer when left to stand. The slurry had a pH of 7.8 and a viscosity of 320 c.p.

The slurry was uniformized under stirring and dried by a spray dryer to obtain a powdery flame retardant.

The flame retardant was found to have a composition of antimony pentoxide ($Sb_2O_5$) 68.1%, $Na_2O$ 9.14%, perchloric acid ($ClO_4$) 2.38%, polyoxyethylene dodecylamine 8.85% and water (including crystal water) 11.53%.

The flame retardant was found to contain 13.4 parts of $Na_2O$, 13.0 parts by weight of polyoxyethylene dodecylamine and 3.5 parts by weight of perchloric acid as $ClO_4$ based on 100 parts by weight of $Sb_2O_5$.

The flame retardant obtained had an average particle size of 11.6 μm. The flame retardant is shown in Table 2, and the evaluation results in Table 3. Water content was measured by differential thermal analysis.

EXAMPLE 2

To 1500 g of an antimony pentoxide sol prepared by the ion exchange method with the use of sodium antimonate as the starting material (specific gravity: 1.127, pH: 2.5, viscosity: 3.0 c.p., $Sb_2O_5$: 12%, $Na_2O$: 0.74%, $Na_2O/Sb_2O_5$ molar ratio: 0.32, particle size: 40 to $60 \times 10^{-3}$ μm) was added 17.9 g of 93% sodium hydroxide, and the mixture was stirred at 50° C. for one hour. After cooling, 38.8 g of 20% aqueous $NaClO_4$ was added and, after stirring for 30 minutes, further 14.4 g of the same polyoxyethylene dodecylamine as in Example 1 was added, followed by stirring for 30 minutes.

The resultant slurry was similar to that obtained in Example 1. The slurry had a pH of 8.5 and a viscosity of 300 c.p. The slurry was dried according to the same method as in Example 1 to obtain a powdery flame retardant.

The flame retardant had a composition of antimony pentoxide ($Sb_2O_5$) 70.3%, $Na_2O$ 10.1%, perchloric acid ($ClO_4$) 2.46%, polyoxyethylene dodecylamine 5.63% and water (including crystal water) 11.51%. The proportions of the respective formulated materials based on 100 parts of $Sb_2O_5$ are shown in Table 2.

The flame retardant had an average particle size of 15 μm. The flame retardant was evaluated in the same manner as in Example 1. The results are shown in Table 3.

Further, the flame retardant was crushed in a Pindisk mill to obtain a flame retardant with an average particle size of 3.0 μm.

EXAMPLE 3

To 1200 g of an antimony pentoxide sol obtained by the same method as in Example 1 (specific gravity: 1.142, pH: 1.75, viscosity: 5.6 c.p., $Sb_2O_5$ 13.4%, $Na_2O$ 0.02%, $Na_2O/Sb_2O_5$ molar ratio: 0.01, and particle size: 5 to $15 \times 10^{-3}$ μm) was added 30.06 g of 93% sodium hydroxide, and the mixture was stirred at 85° C. for one hour. After cooling, 52.9 g of 20% aqueous $NaClO_4$ was added and, after stirring for 30 minutes, further 48.24 g of the same polyoxyethylene dodecylamine as in Example 1 was added, followed by stirring for 30 minutes.

The resultant slurry was similar to that obtained in Example 1. The slurry had a pH of 8.7 and a viscosity of 500 c.p. The slurry was dried according to the same method as in Example 1 to obtain a powdery flame retardant.

The flame retardant had a composition of antimony pentoxide ($Sb_2O_5$) 58.4%, $Na_2O$ 8.95%, perchloric acid ($ClO_4$) 3.12%, polyoxyethylene dodecylamine 17.5% and water (including crystal water) 12.03%. The proportions of the respective formulated materials based on 100 parts of $Sb_2O_5$ are shown in Table 2.

The flame retardant had an average particle size of 13 μm. The flame retardant was evaluated in the same manner as in Example 1. The results are shown in Table 3.

EXAMPLE 4

To 1500 g of an antimony pentoxide sol obtained by the same method as in Example 1 (specific gravity: 1.145, pH: 1.90, viscosity: 4.4 c.p., $Sb_2O_5$ 13.1%, $Na_2O$ 0.98%, $Na_2O/Sb_2O_5$ molar ratio: 0.39, and particle size: 20 to $40 \times 10^{-3}$ μm) was added 18.4 g of 93% sodium hydroxide, and the mixture was stirred at 85° C. for one hour. After cooling, 42.4 g of 20% aqueous $NaClO_4$ was added and, after stirring for 30 minutes, further 32.4 g of a polyoxyethylene tallow alkylamine with added moles of ethylene oxide of 2 (trade name: Naimine $T_2$-202, produced by Nippon Oil & Fats Co., Ltd.) was added, followed by stirring for 30 minutes.

The resultant slurry was similar to that obtained in Example 1. The slurry had a pH of 9.0 and a viscosity of 360 c.p. The slurry was dried according to the same method as in Example 1 to obtain a powdery flame retardant.

The flame retardant had a composition of antimony pentoxide ($Sb_2O_5$) 65.4%, $Na_2O$ 10.0%, perchloric acid ($ClO_4$) 2.29%, polyoxyethylene tallow alkylamine 10.8% and water (including crystal water) 11.51%. The proportions of the respective formulated materials based on 100 parts of $Sb_2O_5$ are shown in Table 2.

The flame retardant had an average particle size of 12 μm. The flame retardant was evaluated in the same manner as in Example 1. The results are shown in Table 3.

Further, the flame retardant was crushed in a Pindisk mill to obtain a flame retardant with an average particle size of 2.5 μm.

EXAMPLE 5

To 1500 g of an antimony pentoxide sol obtained by the same method as in Example 1 (specific gravity: 1.145, pH: 1.90, viscosity: 4.5 c.p., $Sb_2O_5$ 13.1%, $Na_2O$ 0.88%, $Na_2O/Sb_2O_5$ molar ratio: 0.35, and particle size: 20 to $40 \times 10^{-3}$ μm) was added 18.4 g of 93% sodium hydroxide, and the mixture was stirred at 70° C. for one hour. Then, after cooling, 42.4 g of 20% aqueous $NaClO_4$ was added and, after stirring for 30 minutes, further 25.5 g of the same polyoxyethylene dodecylamine as in Example 1, 11.2 g of sorbitan stearate (trade name: Rikemal S-300, produced by Riken Vitamin Co.), and 8.3 g of isopropanol as the solubilizing agent for the sorbitan stearate were added, followed by stirring for 30 minutes.

The resultant slurry was similar to that obtained in Example 1. The slurry had a pH of 8.9 and a viscosity of 420 c.p. The slurry was dried according to the same method as in Example 1 to obtain a powdery flame retardant.

The flame retardant had a composition of antimony pentoxide ($Sb_2O_5$) 64.8%, $Na_2O$ 9.44%, perchloric acid ($ClO_4$) 2.27%, polyoxyethylene dodecylamine 8.41%, sorbitan stearate 3.69% and water (including crystal water) 11.39%. The proportions of the respective formulated materials based on 100 parts of $Sb_2O_5$ are shown in Table 2.

The flame retardant had an average particle size of 13 μm. The flame retardant was evaluated in the same manner as in Example 1. The results are shown in Table 3.

EXAMPLE 6

To 1500 g of the same antimony pentoxide sol as in Example 5 were added 15.3 g of 93% sodium hydroxide and 16.0 g of potassium hydroxide, and the mixture was stirred at 80° C. for one hour. After cooling, 42.4 g of an aqueous NaClO$_4$ was added and, after stirring for 30 minutes, further 32.4 g of the same polyoxyethylene tallow alkylamine as in Example 4 was added, followed by stirring for 30 minutes.

In the slurry obtained, antimony pentoxide was found to form a hydrophobic agglomerate similarly as in Example 1, and it was a slurry separated into layers when left to stand. The slurry had a pH of 9.2 and a viscosity of 350 c.p. The slurry was dried according to the same method as in Example 1 to obtain a powdery flame retardant.

The flame retardant had a composition of antimony pentoxide (Sb$_2$O$_5$) 63.4%, Na$_2$O 8.50%, K$_2$O 3.69%, perchloric acid (ClO$_4$) 2.22%, polyoxyethylene tallow alkylamine 10.45% and water (including crystal water) 11.74%. The proportions of the respective formulated materials based on 100 parts of Sb$_2$O$_5$ are shown in Table 2.

The flame retardant had an average particle size of 12 μm. The flame retardant was evaluated in the same manner as in Example 1. The results are shown in Table 3.

EXAMPLE 7

To 1000 g of the same antimony pentoxide sol as in Example 1 was added 8.6 g of 93% sodium hydroxide, and the mixture was stirred at 85° C for one hour. After cooling to room temperature, 28.2 g of 20% aqueous NaClO$_4$ was added and, after stirring for 30 minutes, 14.4 g of the same polyoxyethylene dodecylamine as in Example 1 was added, followed by stirring for 35 minutes. To the slurry obtained was further added 13.1 g of anhydrous sodium carbonate, and the mixture was stirred for 30 minutes.

The resultant slurry was similar to that obtained in Example 1. The slurry had a pH of 9.9 and a viscosity of 200 c.p. The slurry was dried according to the same method as in Example 1 to obtain a powdery flame retardant.

The slurry was uniformized under stirring and dried by a spray dryer to obtain a powdery flame retardant.

The flame retardant was found to have a composition of antimony pentoxide (Sb$_2$O$_5$) 63.5%, Na$_2$O 12.17%, perchloric acid (ClO$_4$) 2.22%, polyoxyethylene dodecylamine 8.24% and water (including crystal water) 11.23%. The proportions of the respective formulated materials based on 100 parts of Sb$_2$O$_5$ are shown in Table 2.

The flame retardant had an average particle size of 11.6 μm. The flame retardant was evaluated in the same manner as in Example 1. The results are shown in Table 3.

EXAMPLE 8

To 1390 g of the same antimony pentoxide sol as in Example 1 was added 18.1 g of 93% sodium hydroxide, and the mixture was stirred at 85° C for one hour. After cooling to room temperature, 6.35 g of the same polyoxyethylene dodecylamine with added moles of ethylene oxide of 2 as in Example 1, and further 23.7 g of the perchlorate of polyoxyethylene dodecylamine obtained according to the method as described below, followed by stirring for 35 minutes. In the slurry obtained, antimony pentoxide was found to form a hydrophobic agglomerate, and the slurry was separated into aqueous layer and antimony pentoxide containing layer. The slurry had a pH of 7.8 and a viscosity of 350 c.p.

The slurry was uniformized under stirring and dried by a spray dryer to obtain a powdery flame retardant.

The flame retardant was found to have a composition of antimony pentoxide (Sb$_2$O$_5$) 68.1%, Na$_2$O 9.14%, perchloric acid (ClO$_4$) 2.38%, polyoxyethylene dodecylamine 8.85% and water (including crystal water) 11.53%. The proportions of the respective formulated materials based on 100 parts of Sb$_2$O$_5$ are shown in Table 2.

The flame retardant had an average particle size of 11.6 μm. The flame retardant was evaluated in the same manner as in Example 1. The results are shown in Table 3. (Method for preparation of perchlorate of polyoxyethylene dodecylamine)

A solution of 75.0 g of the polyoxyethylene dodecylamine with added moles of ethylene oxide of 2 used in Example 1 dissolved in 36 g of isopropanol was neutralized under stirring with addition of an aqueous 60% perchlorate. Next, the neutralized salt solution was vacuum dried to remove the solvent. A colorless, viscous perchlorate of polyoxyethylene dodecylamine with added moles of 2 was obtained.

EXAMPLE 9

To 1500 g of an antimony pentoxide sol obtained by the ion exchange method with the use of sodium antimonate as the starting material (specific gravity: 1.127, pH: 2.5, viscosity: 3.0 c.p., Sb$_2$O$_5$ 12%, Na$_2$O 0.74%, Na$_2$O/Sb$_2$O$_5$ molar ratio: 0.32, and particle size: 40 to $60 \times 10^{-3}$ μm) was added 20.6 g of 93% sodium hydroxide, and the mixture was stirred at 50° C. for one hour. After cooling, 23.4 g of the same perchlorate of polyoxyethylene dodecylamine as in Example 8 was added, followed by stirring for 30 minutes.

The resultant slurry was similar to that obtained in Example 1. The slurry had a pH of 8.5 and a viscosity of 300 c.p.

The slurry was dried according to the same method as in Example 1 to obtain a powdery flame retardant.

The flame retardant had a composition of antimony pentoxide (Sb$_2$O$_5$) 69.1%, Na$_2$O 9.94%, perchloric acid (ClO$_4$) 2.39%, polyoxyethylene dodecylamine 6.56% and water (including crystal water) 11.98%. The proportions of the respective formulated materials based on 100 parts of Sb$_2$O$_5$ are shown in Table 2.

The flame retardant had an average particle size of 15 μm. The flame retardant was evaluated in the same manner as in Example 1. The results are shown in Table 3.

Further, the flame retardant was crushed in a Pindisk mill to obtain a flame retardant with an average particle size of 3.0 μm.

EXAMPLE

To 1200 g of the same antimony pentoxide sol as in Example 3 was added 33.78 g of 93% sodium hydroxide, and the mixture was stirred at 85° C. for one hour. After cooling to room temperature, 24.62 g of the same polyoxyethylene dodecylamine with added moles of ethylene oxide of 2 as in Example 1, and further 32.3 g of the same perchlorate of polyoxyethylene dodecylamine as in Example 8 were added, followed by stirring for 30 minutes. The slurry obtained was similar to that in Example 1. The slurry had a pH of 8.7 and a viscosity of 500 c.p.

The slurry was uniformized under stirring and dried by a spray dryer to obtain a powdery flame retardant.

The flame retardant was found to have a composition of antimony pentoxide ($Sb_2O_5$) 58.4%, $Na_2O$ 8.95%, perchloric acid ($ClO_4$) 3.12%, polyoxyethylene dodecylamine 17.5% and water (including crystal water) 12.0%. The proportions of the respective formulated materials based on 100 parts of $Sb_2O_5$ are shown in Table 2.

The flame retardant had an average particle size of 13 μm. The flame retardant was evaluated in the same manner as in Example 1. The results are shown in Table 3.

EXAMPLE 11

To 1500 g of an antimony pentoxide sol as in Example 5 was added 21.4 g of 93% sodium hydroxide, and the mixture was stirred at 70° C. for one hour. After cooling to room temperature, 6.6 g of the same polyoxyethylene dodecylamine as in Example 1, and further 25.9 g of the same perchlorate of polyoxyethylene dodecylamine as in Example 8 were added, followed by stirring for 20 minutes. Then, 11.2 g of glycerin mono-12-hydroxystearate (trade name, Rikemal HC-100, produced by Riken Vitamin Co.) and 8.3 g of isopropanol as the solubilizing agent for the glycerin mono-12-hydroxystearate were added, and the mixture was stirred for 30 minutes.

The resultant slurry was similar to that obtained in Example 1. The slurry had a pH of 8.9 and a viscosity of 420 c.p.

The slurry was dried according to the same method as in Example 1 to obtain a powdery flame retardant.

The flame retardant had a composition of antimony pentoxide ($Sb_2O_5$) 64.8%, $Na_2O$ 9.44%, perchloric acid ($ClO_4$) 2.27%, polyoxyethylene dodecylamine 8.41%, glycerin mono-12-hydroxystearate 3.69% and water (including crystal water) 11.39%. The proportions of the respective formulated materials based on 100 parts of $Sb_2O_5$ are shown in Table 2.

The flame retardant had an average particle size of 13 μm. The flame retardant was evaluated in the same manner as in Example 1. The results are shown in Table 3.

EXAMPLE 12

To 826 g of the antimony pentoxide sol with particle sizes of 40 to 70×$10^{-3}$ μm ($Sb_2O_5$ 20.1%, $Na_2O$ 1.43% and $Na_2O/Sb_2O_5$ molar ratio: 0.37) was added 24.4 g of 93% sodium hydroxide, and the mixture was stirred at 70° C. for one hour. After cooling to room temperature, 10.0 g of basic zinc carbonate was added, and the mixture was stirred for 30 minutes. Then, 15.1 g of the same perchlorate of polyoxyethylene dodecylamine as in Example 8, and further 7.5 g of the same sorbitan stearate as in Example 10 and 7.5 g of isopropanol as the solubilizing agent for the sorbitan stearate were added, and the mixture was stirred for 20 minutes. Finally, 7.9 g of zinc benzoate was added, followed by stirring for one hour.

The slurry obtained was similar to that in Example 1. The slurry had a pH of 10.2 and a viscosity of 780 c.p.

The slurry was dried according to the same method as in Example 1 to obtain a powdery flame retardant.

The flame retardant was found to have a composition of antimony pentoxide ($Sb_2O_5$) 62.19%, $Na_2O$ 11.01%, basic zinc carbonate 3.75%, zinc benzoate 2.96%, perchloric acid ($ClO_4$) 1.53%, polyoxyethylene dodecylamine 4.12%, sorbitan stearate 2.81% and water (including crystal water) 11.63%. The proportions of the respective formulated materials based on 100 parts of $Sb_2O_5$ are shown in Table 2.

The flame retardant had an average particle size of 13 μm. The flame retardant was evaluated in the same manner as in Example 1. The results are shown in Table 3.

EXAMPLE 13

To 826 g of the same antimony pentoxide sol as in Example 11 was added 24.4 g of 93% sodium hydroxide, and the mixture was stirred at 70° C. for one hour. Then, at the same temperature, 10.0 g of basic zinc carbonate was added, and the mixture was stirred for 30 minutes. Then, 7.5 g of the same perchlorate of polyoxyethylene dodecylamine as in Example 8, and further 7.5 g of the same sorbitan stearate as in Example 10 and 7.5 g of isopropanol as the solubilizing agent for the sorbitan stearate were added, and the mixture was stirred for 20 minutes. Finally, 7.9 g of zinc benzoate was added, followed by stirring for one hour.

The slurry obtained was similar to that in Example 1. The slurry had a pH of 10.2 and a viscosity of 780 c.p.

The slurry was dried according to the same method as in Example 1 to obtain a powdery flame retardant.

The flame retardant was found to have a composition of antimony pentoxide ($Sb_2O_5$) 64.42%, $Na_2O$ 11.41%, basic zinc carbonate 3.88%, zinc benzoate 3.07%, perchloric acid ($ClO_4$) 0.77%, polyoxyethylene dodecylamine 2.12%, sorbitan stearate 2.91% and water (including crystal water) 11.84%. The proportions of the respective formulated materials based on 100 parts of $Sb_2O_5$ are shown in Table 2.

The flame retardant obtained had an average particle size of 13μm. The flame retardant was evaluated in the same manner as in Example 1. The results are shown in Table 3.

EXAMPLE 14

To 826 g of the same antimony pentoxide sol as in Example 11 was added 24.4 g of 93% sodium hydroxide, and the mixture was stirred at 70° C. for one hour. Then, at the same temperature, 10.0 g of basic zinc carbonate was added, and the mixture was stirred for 30 minutes. Then, 8.72 g of 70% perchloric acid, and further 7.5 g of the same sorbitan stearate as in Example 10 and 7.5 g of isopropanol as the solubilizing agent for the sorbitan stearate were added, and the mixture was stirred for 20 minutes. Finally, 7.9 g of zinc benzoate was added, followed by stirring for one hour.

The slurry obtained was similar to that in Example 1. The slurry had a pH of 9.5 and a viscosity of 740 c.p.

The slurry was dried according to the same method as in Example 1 to obtain a powdery flame retardant.

The flame retardant was found to have a composition of antimony pentoxide ($Sb_2O_5$) 64.77%, $Na_2O$ 11.47%, basic zinc carbonate 3.90%, zinc benzoate 3.08%, perchloric acid ($ClO_4$) 2.36%, sorbitan stearate 2.93% and water (including crystal water) 11.51%. The proportions of the respective formulated materials based on 100 parts of $Sb_2O_5$ are shown in Table 2.

The flame retardant obtained had an average particle size of 13μm. The flame retardant was evaluated in the same manner as in Example 1. The results are shown in Table 3.

COMPARATIVE EXAMPLE 1

To 1500 g of the same antimony pentoxide sol as in Example 5 was added 20.5 g of 93% sodium hydroxide, and the mixture was stirred at 85° C. for one hour. After cooling, 42.4 g of 20% NaClO₄ was added and, after stirring for 30 minutes, further 0.88 g of the same polyoxyethylene dodecylamine as in Example 1 was added, followed by stirring for 30 minutes.

The slurry obtained was similar to that obtained in Example 1. The slurry had a pH of 8.5 and a viscosity of 340 c.p. The slurry was dried according to the same method as in Example 1 to obtain a powdery flame retardant.

The flame retardant was found to have a composition of antimony pentoxide ($Sb_2O_5$) 72.9%, $Na_2O$ 11.0%, perchloric acid ($ClO_4$) 2.6%, polyoxyethylene dodecylamine 0.3% and water (including crystal water) 13.0%.

The proportions of the respective formulated materials based on 100 parts by weight of $Sb_2O_5$ are shown in Table 2.

The flame retardant obtained had an average particle size of 15 μm. The flame retardant was evaluated in the same manner as in Example 1. The results are shown in Table 3.

COMPARATIVE EXAMPLE 2

To 1500 g of an antimony pentoxide sol prepared in the same manner as in Example 1 (specific gravity: 1.145, pH: 1.90, viscosity: 4.5 c.p., $Sb_2O_5$ 13.1%, $Na_2O$ 0.5%, $Na_2O/Sb_2O_5$ molar ratio: 0.20, and particle size: 20 to $40 \times 10^{-3}$ μm) was added 42.4g of 20% NaClO₄ and, after stirring for 30 minutes, 25.6 g of the same polyoxyethylene dodecylamine as in Example 1 was added, followed by stirring for 30 minutes.

The slurry obtained was similar to that obtained in Example 1. The slurry had a pH of 6.5 and a viscosity of 310 c.p. The slurry was dried according to the same method as in Example 1 to obtain a powdery flame retardant.

The flame retardant was found to have a composition of antimony pentoxide ($Sb_2O_5$) 72.4%, $Na_2O$ 3.57%, perchloric acid ($ClO_4$) 2.54%, polyoxyethylene dodecylamine 9.43% and water (including crystal water) 12.06%.

The proportions of the respective formulated materials based on 100 parts by weight of $Sb_2O_5$ are shown in Table 2.

The flame retardant obtained had an average particle size of 12 μm. The flame retardant was evaluated in the same manner as in Example 1. The results are shown in Table 3.

COMPARATIVE EXAMPLE 3

To 1500 g of an antimony pentoxide sol as in Example 4 was added 21.3 g of 93% sodium hydroxide, and the mixture was stirred at 85° C. for one hour. After cooling, 1.2 g of 20% NaClO₄ was added and, after stirring for 30 minutes, further 25.6 g of the same polyoxyethylene dodecylamine was added, followed by stirring for 30 minutes.

The slurry obtained was similar to that obtained in Example 1. The slurry had a pH of 8.7 and a viscosity of 330 c.p. The slurry was uniformized under stirring and dried by a spray dryer to obtain a powdery flame retardant.

The flame retardant was found to have a composition of antimony pentoxide ($Sb_2O_5$) 69.0%, $Na_2O$ 10.58%, perchloric acid ($ClO_4$) 0.069%, polyoxyethylene dodecylamine 8.99% and water (including crystal water) 11.36%.

The proportions of the respective formulated materials based on 100 parts by weight of $Sb_2O_5$ are shown in Table 2.

The flame retardant obtained had an average particle size of 12 μm. The flame retardant was evaluated in the same manner as in Example 1. The results are shown in Table 3.

TABLE 2

Composition of flame retardant (based on 100 parts by weight of $Sb_2O_5$)

| | Example 1 | Example 2 | Example 3 | Example 4 | Example 5 | Example 6 | Example 7 | Example 8 |
|---|---|---|---|---|---|---|---|---|
| $Sb_2O_5$ | 100 | 100 | 100 | 100 | 100 | 100 | 100 | 100 |
| $Na_2O$ | 13.4 | 14.4 | 15.3 | 15.3 | 14.6 | 13.4 | 19.2 | 13.4 |
| $K_2O$ | — | — | — | — | — | 5.8 | — | — |
| $ClO_4$ | 3.5 | 3.5 | 5.3 | 3.5 | 3.5 | 3.5 | 3.5 | 3.5 |
| Polyoxyethylene dodecylamine | 13.0 | 8.0 | 30.0 | — | 13.0 | — | 13.0 | 13.0 |
| Polyoxyethylene tallow alkylamine | — | — | — | 16.5 | — | 16.5 | — | — |
| Sorbitan stearate | — | — | — | — | 5.7 | — | — | — |
| $H_2O$ (containing crystal water) | 16.9 | 16.4 | 20.6 | 17.6 | 17.6 | 18.5 | 17.9 | 16.9 |
| Average grain diameter of starting sol (electron microscope) × $10^{-3}$ μm | 20–40 | 40–60 | 5–15 | 20–40 | 20–40 | 20–40 | 20–40 | 20–40 |

| | Example 9 | Example 10 | Example 11 | Example 12 | Example 13 | Example 14 | Comparative example 1 | Comparative example 2 | Comparative example 3 |
|---|---|---|---|---|---|---|---|---|---|
| $Sb_2O_5$ | 100 | 100 | 100 | 100 | 100 | 100 | 100 | 100 | 100 |
| $Na_2O$ | 14.4 | 15.3 | 14.6 | 17.7 | 17.8 | 17.7 | 15.2 | 4.9 | 15.3 |
| $K_2O$ | — | — | — | — | — | — | — | — | — |
| $ClO_4$ | 3.5 | 5.3 | 3.5 | 2.5 | 1.2 | 3.6 | 3.6 | 3.5 | 0.1 |
| Polyoxyethylene dodecylamine | 9.5 | 30.0 | 13.0 | 6.6 | 3.3 | — | 0.4 | 13.0 | 13.0 |
| Basic zinc carbonate | — | — | — | 6.0 | 6.0 | 6.0 | — | — | — |
| Zinc benzoate | — | — | — | 4.8 | 4.8 | 4.8 | — | — | — |
| Sorbitan stearate | — | — | — | 4.5 | 4.5 | 4.5 | — | — | — |
| Glycerin mono-12-hydroxystearate | — | — | 5.7 | — | — | — | — | — | — |

TABLE 2-continued

| Composition of flame retardant (based on 100 parts by weight of $Sb_2O_5$) | | | | | | | | | |
|---|---|---|---|---|---|---|---|---|---|
| $H_2O$ (containing crystal water) | 17.3 | 20.5 | 17.6 | 18.7 | 18.4 | 17.8 | 18.0 | 16.9 | 16.5 |
| Average grain diameter of starting sol (electron microscope) $\times 10^{-3}$ μm | 40–60 | 5–15 | 20–40 | 40–70 | 40–70 | 40–70 | 20–40 | 20–40 | 20–40 |

TABLE 3

| | Evaluation results | | | | | | | |
|---|---|---|---|---|---|---|---|---|
| | Example | | | | | | | |
| | 1 | 2 | 3 | 4 | 5 | 6 | 7 | 8 |
| Thermal stability 185° C. darkening time (min) | 180 | 180 | 150 | 180 | 180 | 180 | 180 | 180 |
| Initial coloring YI | 11.0 | 8.9 | 13.1 | 12.0 | 9.5 | 10.4 | 10.1 | 11.0 |
| Transparency L % | 82 | 74 | 87 | 75 | 73 | 80 | 80 | 82 |
| Bleeding property | ○ | ○ | ○ | ○ | ○ | ○ | ○ | ○ |
| Thermal durability extension residual % | 89 | 91 | 73 | 93 | 88 | 90 | 90 | 89 |
| Weather resistance extension residual % | 70 | 72 | 65 | 70 | 72 | 64 | 70 | 70 |
| MVSS-302 mm/min | 35 | 70 | 32 | 38 | 47 | 40 | 34 | 35 |
| Oxygen index | 29.8 | 29.2 | 30.3 | 29.8 | 29.4 | 29.4 | 29.5 | 29.8 |

| | Example | | | | | | Comparative example | | |
|---|---|---|---|---|---|---|---|---|---|
| | 9 | 10 | 11 | 12 | 13 | 14 | 1 | 2 | 3 |
| Thermal stability 185° C. darkening time (min) | 180 | 150 | 180 | 140 | 140 | 140 | 135 | 120 | 75 |
| Initial coloring YI | 8.9 | 13.1 | 9.5 | 13.0 | 13.0 | 12.8 | 13.4 | 15.7 | 19.8 |
| Transparency L % | 74 | 87 | 73 | 61.5 | 62 | 60 | 54 | 76 | 72 |
| Bleeding property | ○ | ○ | ○ | ○ | ○ | ○ | X | Δ | X |
| Thermal durability extension residual % | 91 | 73 | 88 | 88 | 85 | 89 | 75 | 65 | 34 |
| Weather resistance extension residual % | 72 | 65 | 72 | 69 | 65 | 70 | 64 | 60 | 15 |
| MVSS-302 mm/min | 70 | 32 | 47 | 69 | 70 | 70 | 120 | 45 | 64 |
| Oxygen index | 29.2 | 30.3 | 29.4 | 29.4 | 29.4 | 29.3 | 27.6 | 29.2 | 29.2 |

We claim:

1. A powder flame retardant for a halogen-containing Vinyl resin, comprising 100 parts by weight of antimony pentoxide and
   (A) 5 to 30 parts by weight of at least one of an alkali metal in the form of a compound, wherein said alkali metal is selected from the group consisting of lithium, sodium and potassium, said parts of said compound being calculated as $M_2O$ where M is said alkali metal;
   (B) 0.2 to 10 parts by weight of perchloric acid radical in the form of an acid, salt or amine thereof, calculated as perchloric acid radical; and
   (C) 1 to 50 parts by weight of a hydrophobic dispersing agent having a boiling point or a decomposition temperature of 200° C. or higher; all of said parts by weight being based on 100 parts by weight of antimony pentoxide.

2. The flame retardant for a halogen-containing vinyl resin according to claim 1, wherein said alkali metal compound is selected from the group consisting of hydroxides of the alkali metal or and carbonates of the alkali metal.

3. The flame retardant for a halogen-containing vinyl resin according to claim 1, wherein the Component (B) is at least one compound selected from the group consisting of perchloric acid, sodium perchlorate, potassium perchlorate, amine perchlorate, ammonium perchlorate, magnesium perchlorate, lithium perchlorate, barium perchlorate, strontium perchlorate, lead perchlorate, cesium perchlorate and rubidium perchlorate; and the Component (C) is selected from the group consisting of a higher fatty acid having 12 or more carbon atoms, an ester of the fatty acid, an ether of the fatty acid, an amide of the fatty acid, a phosphate of an ether type nonionic surfactant, an aliphatic amine having a boiling point or a decomposition point temperature of 200° C. or higher, an aromatic amine having a boiling point or a decomposition point temperature of 200° C. or higher, an amine type surfactant with average added moles of ethylene of 1 to 5, a sorbitan fatty acid ester, a fatty acid ester of neopentyl polyol, a glycerin fatty acid ester, a fatty acid monoamide of neopentyl polyol, a polyoxyethylene adduct of a monoalkyl phosphate, a dialkyl phosphate, a monoaryl phosphate, a diaryl phosphate, a monoalkylaryl phosphate and a dialkylaryl phosphate.

4. The flame retardant for a halogen-containing vinyl resin according to claim 1, wherein the component (A) is selected from the group consisting of sodium hydroxide and sodium carbonate; the component (B) is selected from the group consisting of a perchlorate of dodecylamine, a perchlorate of tetradecylamine, a perchlorate of octadecylamine, a perchlorate of diphenylamine, a perchlorate of naphthylamine, a perchlorate of dibenzylamine, a perchlorate of tribenzylamine, a perchlorate of phenylethylamine, a perchlorate of triethanolamine, a perchlorate of diethanolamine, a perchlorate of oxyethylene dodecylamine, a perchlorate of polyoxyethylene dodecylamine, a perchlorate of polyoxyethylene octadecylamine, a perchlorate of polyoxyethylene tallow alkylamine, a perchlorate of polyoxyethylene tallow alkylpropylenediamine and sodium perchlorate and wherein the Component (C) is selected from the group consisting of dodecylamine, tetradecylamine, octadecylamine, diphenylamine, naphthylamine, dibenzylamine, tribenzylamine and phenylethylamine.

5. The powder flame retardant for a halogen-containing vinyl resin according to claim 1, wherein said Component (A) is sodium hydroxide, said Component (B) is NaClO$_4$ and said Component (C) is polyoxyethylene dodecylamine with added moles of ethylene oxide of 2.

6. The powder flame retardant for a halogen-containing vinyl resin according to claim 1, wherein said Component (A) is sodium hydroxide, said Component (B) is NaClO$_4$ and said Component (C) is polyoxyethylene tallow alkylamine with added moles of ethylene oxide of 2.

7. The powder flame retardant for a halogen-containing vinyl resin according to claim 1, wherein said Component (A) is sodium hydroxide, said Component (B) comprises perchlorate of polyoxyethylene dodecylamine and glycerin mono-12-hydroxystearate.

8. The powder flame retardant for a halogen-containing vinyl resin according to claim 1, wherein said alkali metal compound is an alkali metal perchlorate which provides alkali metal and perchloric acid radical components.

9. The flame retardant for a halogen-containing vinyl resin according to claim 1, wherein the Components (B) is at least one compound selected from the group consisting of perchloric acid, sodium perchlorate, potassium perchlorate, amine perchlorate, ammonium perchlorate, magnesium perchlorate, lithium perchlorate, barium perchlorate, strontium perchlorate, lead perchlorate, cesium perchlorate and rubidium perchlorate.

10. The flame retardant for a halogen-containing vinyl resin according to claim 1, wherein the Component (C) is polyoxythylene dodecylamine with added moles of ethylene oxide of 2, polyoxyethylene tallow alkylamine with added moles of ethylene oxide of 2 or sorbitan stearate.

11. The flame retardant for a halogen-containing vinyl resin according to claim 1, wherein the Component (C) is at least one compound selected from the group consisting of a hydrophobic amine compound, a higher fatty acid having 12 or more of carbon atoms, an ester of the fatty acid, an ether of the fatty acid, an amide of the fatty acid and a phosphate of an ether type nonionic surfactant.

12. The flame retardant for a halogen-containing vinyl resin according to claim 11, wherein the Component (C) is at least one compound selected from the group consisting of an aliphatic amine having a boiling point or a decomposition point temperature of 200° C. or higher, an aromatic amine having a boiling point or a decomposition point temperature of 200° C. or higher, and an amine type surfactant with average added moles of ethylene oxide of 1 to 5.

13. The flame retardant for a halogen-containing vinyl resin according to claim 11, wherein the Component (C) is at least one compound selected from the group consisting of a sorbitan fatty acid ester, a fatty acid ester of neopentyl polyol, a glycerin fatty acid ester and a fatty acid monoamide of neopentyl polyol.

14. The flame retardant for a halogen-containing vinyl resin according to claim 11, wherein said Component (C) is the phosphate of the ether type nonionic surfactant which is at least one compound selected from the group consisting of a polyoxyethylene adduct of a monoalkyl phosphate, a dialkyl phosphate, a monoaryl phosphate, a diaryl phosphate, a monoalkylaryl phosphate and a dialkylaryl phosphate.

15. The powder flame retardant for a halogen-containing vinyl resin according to claim 11, wherein said Component (C) is said hydrophobic amine compound and said hydrophobic amine compound is a perchlorate amine compound which provides perchloric acid radical and hydrophobic amine components.

16. The flame retardant for a halogen-containing vinyl resin according to claim 2, wherein said Component (A) is sodium hydroxide or sodium carbonate.

17. The flame retardant for a halogen-containing vinyl resin according to claim 9, wherein the Component (B) is the amine perchlorate which is a perchlorate obtained from at least one amine selected from the group consisting of aliphatic amines and aromatic amines, said amines having a boiling point or a decomposition temperature of 200° C. or higher and amine type surfactants with average added moles of ethylene oxide of 1 to 20.

18. The flame retardant for a halogen-containing vinyl resin according to claim 17, wherein the Component (B) is the amine perchlorate which is a perchlorate obtained from at least one amine selected form the group consisting of alkylamines and alkanolamines, said amines having a boiling point of decomposition temperature of 200° C. or higher.

19. The flame retardant for a halogen-containing vinyl resin according to claim 17, wherein the Component (B) is a perchlorate of an aliphatic amine having 9 or more carbon atoms.

20. The flame retardant for a halogen-containing vinyl resin according to claim 19, wherein the aliphatic amine is dodecylamine, tetradecylamine or octadecylamine.

21. The flame retardant for a halogen-containing vinyl resin according to claim 17, wherein the Component (B) is a perchlorate of diphenylamine or naphthylamine.

22. The flame retardant for a halogen-containing vinyl resin according to claim 17, wherein the Component (B) is a perchlorate of dibenzylamine, tribenzylamine or phenylethylamine.

23. The flame retardant for a halogen-containing vinyl resin according to claim 17, wherein the Component (B) is a perchlorate of triethanolamine or diethanolamine.

24. The flame retardant for a halogen-containing vinyl resin according to claim 17, wherein the Component (B) is a perchlorate of an alkylamine ethylene oxide derivative with added moles of ethylene oxide of 1 to 20.

25. The flame retardant for a halogen-containing vinyl resin according to claim 24, wherein the alkylamine ethylene oxide derivative is oxyethylene dodecylamine, polyoxyethylene dodecylamine, polyoxyethylene octadecylamine, polyoxyethylene tallow alkylamine or polyoxyethylene tallow alkylpropylenediamine.

26. The flame retardant for a halogen-containing vinyl resin according to claim 9, wherein the Component (B) is sodium perchlorate or perchlorate of polyoxyethylene dodecylamine.

27. The flame retardant for a halogen-containing vinyl resin according to claim 12, wherein the Component (C) is dodecylamine, tetradecylamine or octadecylamine.

28. The flame retardant for a halogen-containing vinyl resin according to claim 12, wherein the Component (C) is diphenylamine or naphthylamine.

29. The flame retardant for a halogen-containing vinyl resin according to claim 12, wherein the Component (C) is dibenzylamine, tribenzylamine or phenylethylamine.

30. A powder flame retardant for a halogen-containing vinyl resin, comprising 100 parts by weight of antimony pentoxide and
   (A) 5 to 30 parts by weight of at least one of an alkali metal in the form of a compound, wherein said alkali metal is selected from the group consisting of lithium, sodium and potassium, said parts by weight of said compound being calculated as $M_2O$ where M is said alkali metal, wherein a portion of said alkali metal is replaced with a soluble hydroxide of Mg, Ca, Sr, Ba, Zn or Pb or a salt of Zn or Pb;
   (B) 0.2 to 10 parts by weight of perchloric acid radical in the form of the acid or a salt or amine thereof, calculated as perchloric acid radical; and
   (C) 1 to 50 parts by weight of a hydrophobic dispersing agent having a boiling point or a decomposition temperature of 200° C. or higher; all of said parts by weight being based on 100 parts by weight of antimony pentoxide.

31. A powder flame retardant for a halogen-containing vinyl resin, consisting essentially of 100 parts by weight of antimony pentoxide and
   (A) 5 to 30 parts by weight of at least one of an alkali metal in the form of a compound, wherein said alkali metal is selected from the group consisting of lithium, sodium and potassium, said parts of said compound being calculated as $M_2O$ where M is said alkali metal;
   (B) 0.2 to 10 parts by weight of perchloric acid radical in the form of an acid, salt or amine thereof, calculated as perchloric acid radical; and
   (C) 1 to 50 parts by weight of hydrophobic dispersing agent having a boiling point or a decomposition temperature of 200° C. or higher;
all of said parts by weight being based on 100 parts by weight of antimony pentoxide.

* * * * *